May 25, 1965 B. E. ATTWOOD 3,185,889

TIME-BASE CIRCUIT EMPLOYING TRANSISTORS

Filed May 29, 1962 2 Sheets-Sheet 1

INVENTOR
*BRIAN E. ATTWOOD*
BY
AGENT

May 25, 1965 B. E. ATTWOOD 3,185,889

TIME-BASE CIRCUIT EMPLOYING TRANSISTORS

Filed May 29, 1962 2 Sheets-Sheet 2

INVENTOR
BRIAN E. ATTWOOD

BY Frank R. Jeffer[illegible]
AGENT

United States Patent Office 3,185,889
Patented May 25, 1965

3,185,889

TIME-BASE CIRCUIT EMPLOYING TRANSISTORS

Brian Ernest Attwood, Burstow, near Horley, Surrey, England, assignor to North American Philips Company, Inc., New York, N.Y., a corporation of Delaware Filed May 29, 1962, Ser. No. 198,664
Claims priority, application Great Britain, June 1, 1961, 19,810/61
10 Claims. (Cl. 315—27)

This invention relates to field time base circuit arrangements for use in a magnetic beam deflection system comprising, in combination, a transistor amplifier output stage having an inductance in the collector circuit of the transistor, base bias means for the transistor, a clipping diode or equivalent device which is coupled to the collector of said transistor or to a tapping on said inductance, D.C. collector supply means, and a combination of a voltage dependent resistive element R$v$ and a capacitance C$v$ which are in parallel for alternating currents.

The waveform of the voltage occurring across the active device in a field output stage is such that the peak voltage during the flyback time depends on the effective inductance of the load and the rate of change of current in the load. In a given circuit for a given scan there is therefore a minimum value of this peak voltage which occurs when the rate of change of current is a minimum. This minimum will be achieved when the current change during flyback takes place at a constant rate throughout the entire flyback time available. This peak collector voltage rating has a major effect on performance and cost.

In a conventional circuit, the peak collector voltage is determined by a number of factors, such as transistor characteristics, choke inductance, conductance of the output stage during the flyback period, H.T. voltage (i.e. collector supply), and $L/R$ ratio of the beam deflection coils.

From the well-known relationship $V=IR+L(di/dt)$ for a circuit containing a resistance R, a current therethrough I, and an inductance L with rate of change of current therethrough $(di/dt)$, the peak voltage across the collector and emitter of the output transistor during flyback can be determined. In order to minimize this voltage, it it important that the shape of the flyback current waveform be linear. An approximation to this form of current can conveniently be obtained by means of limiting the peak collector voltage at such a value that reversal of the scanning current can occur within the allocated flyback time. When the limiting device is, for example, a Zener diode or a voltage dependent resistor (V.D.R.), which always limits at the same voltage value, a stable voltage can be obtained with a value much higher than the supply voltage —H.T.

Field output circuit arrangements are known in which this is realized and they are discussed in a Symposium about "Transistorized Television Receivers" held on the 17th of March 1961 at Mullard House, Torrington Place, London, W.C. 1. (See paper I of this Symposium.) Such a known output circuit (namely that of figure 8 of said paper I) is reproduced in FIGURE 1 of the accompanying drawings and will be described more fully hereinafter.

However, if the output stage is stabilized, there still remains the difficulty that the sawtooth signal driving said output stage does not have a constant amplitude when the supply voltage —H.T. varies. In that case the peak to peak current through the output stage will not be constant, so that the slope of the sawtooth current flowing through the deflection coil will still vary, which is undesirable.

Of course, it would be possible to use a further Zener diode or V.D.R. for stabilizing part of said supply voltage —H.T. However, for doing so only part of said —H.T. voltage can be stabilized due to the fact that for a good stabilizing action a series resistor must be included between the —H.T. terminal and one end of the stabilizing device, the other end of which is connected to the +H.T. terminal. For example, suppose that the —H.T. voltage is about —12.6 v., then a Zener diode may be used for stabilizing a voltage of about —10 v. So only this 10 v. is available for loading a capacitor through a resistor. As is known in the art, the voltage developed across said capacitor is of the exponential form. When using only a small part of said capacitor voltage it can be said that this part is substantially linear and can be used as a sawtooth control voltage for the output stage. However, the amplitude of the sawtooth voltage is relatively small since the supply voltage is small.

Now the stable voltage obtained from the output stage is of the order of —38 v. whereas, as explained above, the stable voltage obtained when an additional stabilizing device is used, may be of the order of —10 v. Thus it will be clear that in the former case the sawtooth voltage obtained has a much greater amplitude with the same linearity as when an additional stabilizing device is used. Moreover, when using a single stabilizing device instead of two the cost of the whole field time base circuit is reduced.

According to the present invention, a field time base circuit arrangement is used which employs an output stage similar to that of the known circuit arrangement, and it is an object of the present invention to utilize the stable voltage obtained with said output stage as a stable supply voltage for the driver stage of said output stage.

Therefore, the field time base circuit arrangement in accordance with the invention is characterized in that the voltage dependent resistive element R$v$ of said combination is connected between said diode and a grounded terminal of the D.C. collector supply means so as to provide a stable voltage point P$v$ corresponding to an electrode of said diode or equivalent, a charge network including a capacitor for supplying a sawtooth drive to said transistor, a connection from said stable voltage point P$v$ to said charge network for supplying a stable voltage to the charge circuit which provides a sawtooth drive which is stabilized in amplitude against changes in collector supply, and an oscillator circuit for periodically discharging the capacitor of said charge network.

Preferably the output stage is a "Class A" stage with the transistor connected in grounded-emitter configuration, and this will be assumed in the following description. It will also be assumed, for convenience, that the arrangement operates as part of a television receiver or like display system which is entirely supplied by a low-voltage H.T. source, typically a 12-volt battery supplying directly the collector voltage.

Magnetic deflection coils for a cathode-ray tube can be connected (in series with a blocking capacitor) between the collector of the output transistor and one of the collector supply terminals.

The voltage dependent resistive element may, for example, be a Zener diode, in which case almost perfect stabilization of the stable voltage can be obtained. The slope of the sawtooth drive current for the deflection coils is also substantially fixed, but slight changes in field scan amplitude can occur if the EHT of the associated cathode-ray tube is affected by a change in the overall supply voltage.

Preferably, however, the voltage-dependent resistive element is a voltage-dependent resistor (VDR) since, apart from the reduction in cost, there is the advantage that some small change in field scan is actually required for correct aspect ratio in order to offset the drop in EHT from the line time base which would normally cause an increase in picture size.

The driver circuit for periodically charging and discharging the capacitor of the resistor-capacitor network may, if desired, be a blocking oscillator circuit employing a transistor, and an example of such an arrangement will be described hereinafter.

Preferably, however, the driver circuit employs a four-layer semi-conductor device (e.g. a p-n-p-n device) having characteristics of the thyristor type, said device being connected across the charge capacitor so as to break down automatically when the charge potential passes a predetermined value. This arrangement permits a reduction in then umber and bulk of the components as compared with a blocking oscillator. In order to achieve good frequency stability with this type of oscillator it is essential to have a stable voltage supply such as would not normally be available, but in the present case such a stable supply voltage is already obtained from the output stage.

It is desirable that the base bias means of the output transistor (if such means is a resistance network) be fed also from said stable-voltage.

Specific embodiments of the invention incorporating the above preferred features will now be described by way of example with reference to the accompanying drawings, in which.

Figure 1:
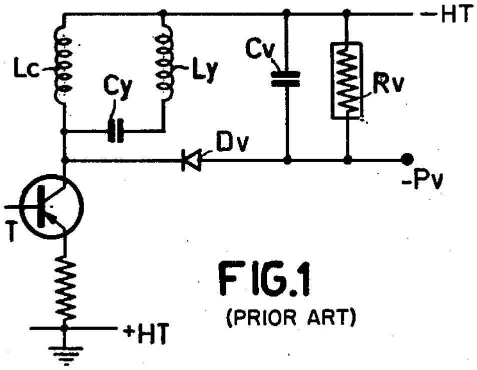
FIG.1 (PRIOR ART)
FIG. 1 shows a known output stage.

Referring now to the known output stage shown in FIG. 1, a transistor T, choke L*c*, field deflection coil L*y* and coupling capacitor C*y* are arranged in a conventional manner. The added components are a clipping diode D*v*, a capacitor C*v* and a voltage-dependent resistive element R*v*.

When the collector of transistor T goes sufficiently negative, the diode conducts and feeds current to a point P*v* which could be connected to a stabilized supply in the absence of R*v*. However, the use of a low-impedance supply as a reference is not very suitable because of the extra components required to give the stabilizing voltage. Therefore, R*v* is provided in the circuit of FIGURE 1 and the values of R*v* and C*v* are chosen so that C*v* charges up to a mean voltage equal to the required clipping voltage. R*v* could be a linear resistor but for the present purposes it is a voltage-dependent resistive element since the latter gives a smaller change in flyback voltage than a linear resistor for given H.T. and circuit changes.

The use of a diode means that under nominal conditions, the flyback voltage can be reduced almost to the theoretical value of the voltage calculated to give reversal of the scanning current, only small percentage changes in peak voltage occurring due to variations in supply voltage. A further advantage is that the flyback time is now fixed by the value of this voltage, and thus the transistor conduction time during the flyback period can be reduced to a very low value without having any effect on the peak voltage. This means that the transistor dissipation can be very much reduced.

Figure 2:
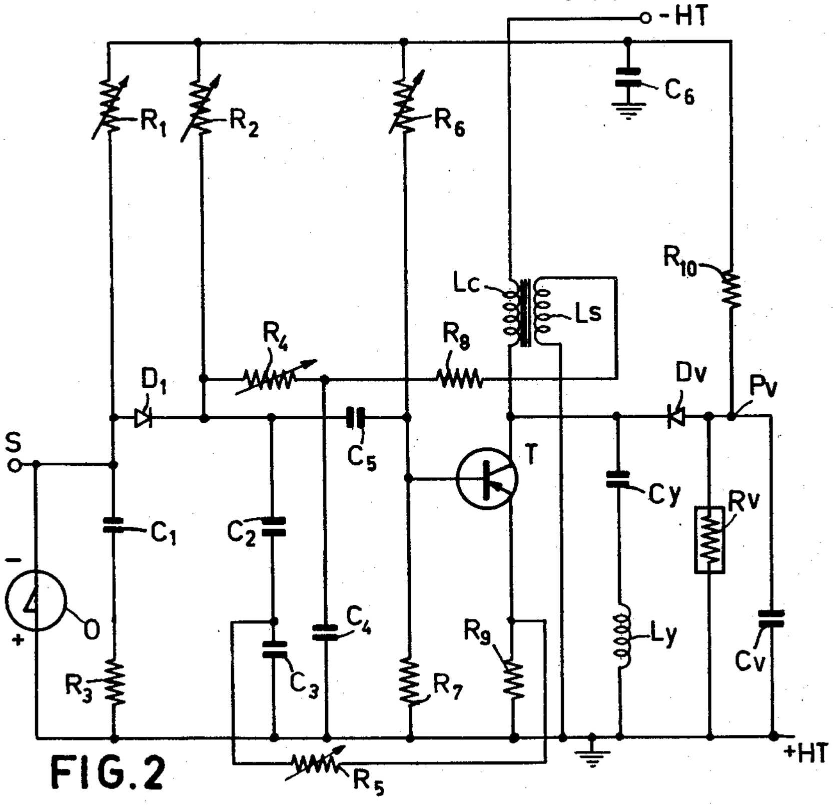
FIG. 2 shows a first embodiment of a field time base circuit arrangement in accordance with the invention using a thyristor in the driver circuit.

Referring now to FIGURE 2 of the drawings, the circuit arrangement shown comprises a transistor output stage similar to that of FIGURE 1 and comprising a transistor T with a choke inductance L*c* in its collector circuit. The inductance L*c* in this case is coupled to a feedback winding L*s*. The clipping diode is shown at D*v* and is connected to a VDR R*v* and a capacitor C*v* in a manner analogous to the arrangement of FIGURE 1 (in this case the components R*v*–C*v* are both connected to the +H.T. terminal instead of —H.T. as this provides a very stable voltage with respect to earth; component C*v* could be connected to —H.T. while leaving component R*v* connected to +H.T. since R*v* and C*v* would still be in parallel for A.C.). The point P*v* of FIGURE 2 is the stable point from which a stable recovery voltage is taken (this point is analogous to the point P*v* of FIGURE 1 but provides a far more stable voltage than the corresponding point of FIGURE 1 due to the fact that the voltage is stabilized with respect to earth, thus eliminating the influence of the supply voltage H.T.). The field deflection coils L*y* are shown connected, as before, to the collector of transistor T via a blocking capacitor C*y* (the only nominal difference is that these components are connected to earth, i.e. to the positive H.T. supply line, although they could be connected to the negative supply line as in FIGURE 1).

The base of transistor T has a bias network which comprises resistances R6 and R7, and this network is one of the circuits supplied from the stable point P*v*. This supply, and the others which will be mentioned, are effected through smoothing components C6 and R10 which, however, can be dispensed with if capacitor C*v* is increased in value.

A sawtooth drive waveform is supplied to the base of transistor T via a capacitor C5. This waveform is generated in a charging network R2–C2–C3. The capacitor system C2–C3 is charged up from the D.C. supply source of the network (in this case this is again the point P*v*) and this progressive charge provides the stroke of the sawtooth. The oscillator circuit for periodically discharging the capacitor system C2–C3 is synchronized by negative-going pulses applied at terminal S and employs a p-n-p-n junction device O, which has characteristics of the thyristor type, together with elements R1–C1–R3. The fact that this oscillator circuit is fed from the stable point P*v* improves its frequency stability. Although a sawtooth wave appears across capacitor C1, this wave is not directly used to drive the transistor T due to its poor linearity.

To improve the linearity of the sawtooth wave, the secondary winding L*s* is coupled to the inductance L*c*. The winding L*s* serves to provide feedback to the charge circuit R2–C2–C3 so as to improve the linearity of the sawtooth waveform.

The small resistance R9 is provided in the emitter lead of the transistor T in order to provide (*a*) an additional feedback voltage to linearize the charge circuiflt for end-of-scan non-linearity, and (*b*) to reduce collector current changes and the effects of changes in the short-circuit gain $\alpha'$ of the transistor with temperature. This feedback circuit through resistor R5 can be omitted with a very small loss in linearity of the scan, and said loss can be minimized by choosing an appropriate transistor transfer characteristic.

Figure 3:
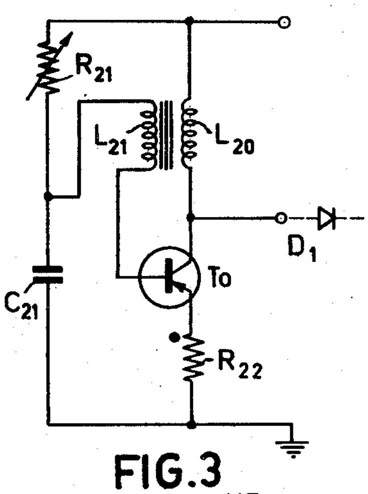
FIG. 3 shows a blocking oscillator circuit which can be used as a driver circuit in the arrangement of FIG. 2

FIGURE 3 shows an alternative oscillator circuit which can be used in place of the p-n-p-n circuit in the circuit arrangement of FIGURE 2. This oscillator circuit is, except for the Negative Temperature Coefficient (N.T.C.) resistor R22, a conventional blocking oscillator employing a transistor T*o* with a transformer L20–L21. Its collector supply can be taken from the H.T. line or, preferably, from point P*v*.

In the circuit of FIG. 2, the resistor R6 is adjustable in order to vary the base bias of transistor T, the resistor R2 is adjustable for setting the amplitude of the field scan, and the resistor R1 (or R21 in FIGURE 3) is adjustable as a "field hold" control.

A practical set of values and components for the arrangement of FIGURE 2 is given below by way of illustration for a 405-line television receiver capable of giving 110° deflection.

*Table*

| | |
|---|---|
| H.T. voltage | 12.6 volts. |
| Transistor T | Mullard Type OC 23. |
| Diode Dv | Mullard Type OA 47. |
| Diode D1 | Mullard Type OA 45. |
| Stable voltage at Pv | about 38 volts. |
| Resistor Rv (VDR) | Mullard Type VV 311. |
| Resistor R1 | 25KΩ. |
| Resistor R2 | 2KΩ. |
| Resistor R3 | 100Ω. |
| Resistor R4 | 500Ω. |
| Resistor R5 | 20Ω. |
| Resistor R6 | 5KΩ. |
| Resistor R7 | 560Ω. |
| Resistor R8 | 1.2KΩ. |
| Resistor R9 | 2Ω. |
| Resistor R10 | 39Ω. |
| Capacitor Cv | 50 μf. |
| Capacitor Cy | 1000 μf. |
| Capacitor C1 | 0.25 μf. |
| Capacitor C2 | 100 μf. |
| Capacitor C3 | 100 μf. |
| Capacitor C4 | 10 μf. |
| Capacitor C5 | 500 μf. |
| Capacitor C6 | 100 μf. |
| Choke Lc | 350 turns, D.C. resistance =2Ω inductance=210 mh. at mean collector current. |
| Ly | 2.9 mh. and 39Ω. |
| Winding Ls | 438 turns. |

With the above values, the element O may be a four-layer diode having the following characteristics:

| | | |
|---|---|---|
| Switching voltage | volts | 6 |
| Holding current | ma | 50 |

Resistance (in OFF state) greater than 1 mΩ.
Resistance (in ON state) less than 1Ω at 1 amp.

The VDR Rv can, if desired, be replaced by an appropriate Zener diode without changing the values of the other components.

If the element O has a higher switching voltage, for example, 16 volts, it may be difficult to start the arrangement. This difficulty may be obviated by giving the H.T. voltage a value which is higher than 16 volts or by including a feedback path from collector to base of transistor T so as to make the circuit self-starting. The feedback signal should be small as compared with the signal obtained from the charging network once the circuit is started. Thus, after starting, the circuit operates in a manner as described above.

As will be clear from the foregoing description, the slope and the amplitude of the sawtooth wave developed across capacitor C1 will be constant in spite of variations in the supply voltage —H.T. due to the charging of said capacitor from the stable voltage point Pv. Because the slope and the amplitude of the drive signal for the base of transistor T are constant also, the slope and the amplitude of the collector current through transistor T will be constant when the —H.T. voltage varies, due to the fact that collector voltage variations, which are the result of the variations in —H.T., have practically no influence upon the collector current.

However, the circuit arrangement of FIGURE 2 still has the disadvantage that the flyback time and the amplitude of the sawtooth current through the deflection coil Ly will vary when the —H.T. voltage varies. This can be explained as follows. Suppose that the stable voltage at the point Pv has an absolute value of Vd volts ($Vd$>H.T.). As mentioned above, the collector current through the transitor T has a constant amplitude which means that the peak collector current $i_{pk-pk}$ is constant. This means that at the end of a scan a constant current $i_{pk-pk}$ is flowing through coil Ly. The impedance of choke Lc is high as compared with that of coil Ly so that practically all the collector current flows through Ly.

The voltage across capacitor Cy will be equal to H.T. volt because no D.C. voltage can be developed across choke Lc and coil Ly. During the flyback time $\tau$ transistor T is made non-conducting due to the drive signal applied to the base of the transistor. Thus, during flyback time the collector voltage decreases due to the decrease of current through the deflection coil. The decrease of the collector voltage will continue until this voltage reaches the value Vd at point Pv. Then diode Dv will conduct and holds the junction of capacitor Cy and diode Dv at the constant value Vd a long as the diode Dv is conducting. Because the voltage across capacitor Cy is equal to H.T. volt, it can easily be calculated that during flyback time (that means the time during which diode Dv is conducting) the voltage E across coil Ly is equal to $$Vd-H.T.=E \quad (1)$$

Because the voltage across the coil Ly is also given by $$-Ly\frac{di}{dt} \quad (2)$$

wherein $i$ is the current through coil Ly during flyback time, it follows that $$E=-Ly\frac{di}{dt} \quad (3)$$

or $$i=-\int\frac{E}{Ly}dt=-\frac{E}{Ly}t+i_{pk-pk} \quad (4)$$

Now the flyback time $\tau$ will be finished when the diode current is zero so that for $t=\tau$—$i=0$ or $$\frac{E}{Ly}\tau=i_{pk-pk} \quad (5)$$

which can be written as $$\tau=i_{pk-pk}\cdot\frac{Ly}{E} \quad (6)$$

When —H.T. varies, the value E will vary and because $i_{pk-pk}$ and Ly are constants, it follows therefrom that $\tau$ must vary.

In practice, the transistor T is made to conduct at the end of the flyback time well before the diode current becomes zero. Therefore, the flyback time $\tau$ will be somewhat smaller than may be deduced from Formula 6, but this does not change the effect that $\tau$ varies when the supply voltage H.T. varies.

Because $i_{pk-pk}$ is a constant and the flyback time $\tau$ varies, it follows that the amplitude of the sawtooth current through coil Ly also varies, whereas its slope during the scan is constant.

This does no harm if only part of the sawtooth current is of importance during the vertical scan. This may be the case when a mask covers the screen of a picture tube so that upper and lower part of said screen cannot be observed.

However, when the whole screen is to be observed, the full amplitude of the sawtooth current must be used and no variation in vertical scan amplitude can be tolerated. Here it may be remarked that it is assumed that the EHT is also stabilized. If this is not the case, a V.D.R. may be used for the device Rv instead of a Zener diode, as mentioned in the preamble.

Figure 4:
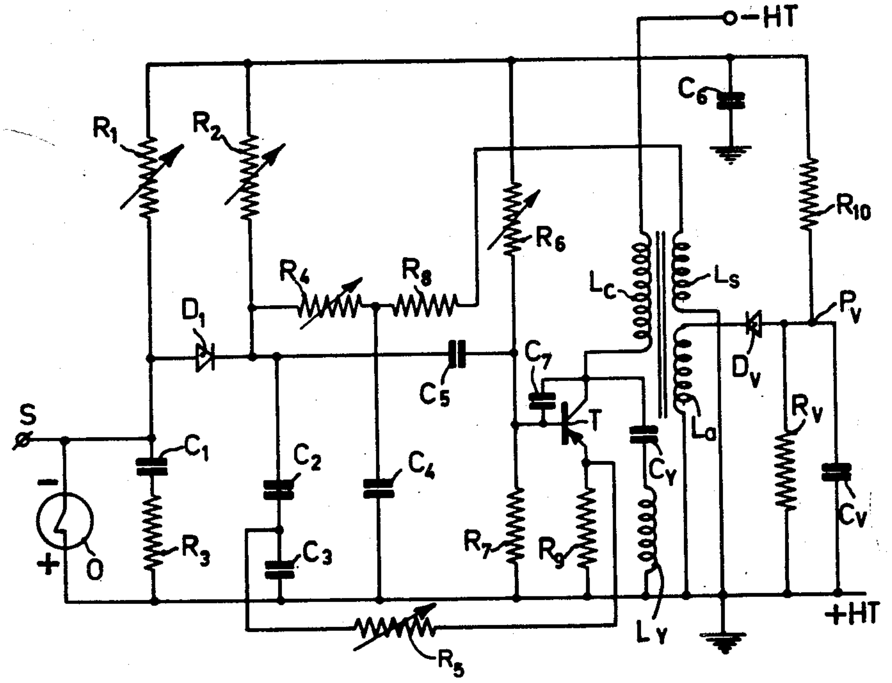
FIG. 4 shows a further embodiment in accordance with the invention.

This last disadvantage can be avoided by means of a circuit arrangement as shown in FIGURE 4. In FIG. 4, elements which correspond to the same elements in FIG. 2 are denoted by like reference characters. To do this there is included in the arrangement of FIGURE 4 a tertiary winding La which is tightly coupled with the primary winding Lc. Now during flyback time the collector voltage decreases and, due to the construction of winding $La$, the voltage at the cathode of diode $Dv$ also decreases. This will continue until the voltage at the cathode of diode $Dv$ reaches the voltage $Vd$ at the point $Pv$. Diode $Dv$ then will conduct again and will do so until the diode current becomes zero. Thus, during flyback time there exists a stable voltage of the value $Vd$ across winding $La$, and because windings $La$ and $Lc$ are tightly coupled together, there also exists a stable voltage across winding $Lc$. In this circuit too there will be developed a D.C. voltage of H.T. volt across capacitor $Cy$. Because the series connection of coils $Ly$ and $Lc$ together with the capacitor $Cy$ are connected to the H.T. supply voltage it will be clear that, during flyback time, when transistor T is in the nonconducting state, the voltage across coil $Ly$ must be equal to the voltage across winding $Lc$. As explained above, the voltage across winding $Lc$ is a stable voltage so that the voltage across coil $Ly$ is also constant, because when the —H.T. voltage varies, the voltage across capacitor $Cy$ varies to the same extent and this has no influence upon the voltages across winding $Lc$ and deflection coil $Ly$. Thus voltage E across coil $Ly$ is constant and it follows from Formulae 4 and 6 that the slope of the sawtooth during flyback and the flyback time $\tau$ itself will be constant, thereby giving a constant amplitude of the total sawtooth during scan and flyback time.

As will be clear from FIGURE 4, as long as no sawtooth current flows through coil $Ly$, no voltage will be developed at point $Pv$. So when switching on the circuit arrangement no supply voltage for charging capacitor C1 is present and thus no drive signal is obtained for transistor T.

To avoid this difficulty the circuit is made self-starting by connecting a small capacitor C7 between collector and base of transistor T. Therefore, when the circuit switched on, a small feedback signal is applied to the base of transistor T, and as soon as the whole circuit arrangement is in normal operation, this feedback signal can be neglected with respect to the signal obained from the drive circuit.

It should be remarked that alhough a PNP transistor T is shown, it will be evident that an NPN transistor may be used instead. In that case the polarity of the D.C. collector supply means must be reversed as well as the connection of diodes $Dv$ and D1 and the oscillator O.

What is claimed is:

1. A deflection circuit for a magnetic beam deflection system, comprising a transistor amplifier output stage having an output electrode and a control electrode, an output circuit comprising an inductance element coupled to said output electrode, a source of direct voltage having a terminal connected to a point of fixed potential and connected so as to supply operating potentials to said transistor amplifier, a charge circuit comprising a capacitor for supplying a sawtooth drive signal to said transistor control electrode, circuit means for providing a stable operating voltage comprising a voltage dependent impedance element and a second capacitor, means connecting said second capacitor and said impedance element in parallel for alternating currents, a diode coupling said output circuit to said circuit means, said circuit means further comprising means connecting said voltage dependent impedance element to said diode and to said point of fixed potential, means for applying said stable voltage to said charge circuit thereby providing operating potential for said charge circuit, and switching means coupled to said charge circuiut for periodically discharging said capacitor.

2. A deflection circuit for a magnetic beam deflection system having a deflection coil, comprising a transistor amplifier output stage having an output electrode and a control electrode, an inductance element coupled to said output electrode, a source of direct voltage having a first terminal connected to ground and a second terminal for applying an operating potential to said output electrode, a diode coupled to said output electrode, a charge circuit comprising a capacitor for supplying a sawtooth drive signal to said transistor control electrode, circuit means for providing a stable operating voltage comprising a voltage dependent impedance element and a second capacitor, means connecting said second capacitor and said impedance element in parallel for alternating currents, said circuit means further comprising means connecting said voltage dependent impedance element between a terminal of said diode and ground so as to provide a stable operating voltage point at a terminal of said diode, means connecting said stable voltage point to said charge circuit for supplying operating potential to said charge circuit whereby the sawtooth drive signal supplied by said charge circuit is stabilized in amplitude, and switching means coupled to said charge circuit for periodically discharging said capacitor.

3. Apparatus as described in claim 2 further comprising means for supplying a bias voltage to said transistor control electrode comprising a resistance network connected to said control electrode and means connecting said stable operating voltage point to said resistance network for supplying operating potential thereto.

4. Apparatus as described in claim 3 wherein said transistor amplifier is connected in common-emitter configuration, and said resistance network for supplying said bias voltage is arranged so as to cause said transistor output stage to operate as a class A amplifier.

5. Apparatus as described in claim 2 wherein said switching means comprises a four-layer semi-conductor device having characteristics of the thyristor type, means connecting said stable operating voltage point to said semiconductor device so as to supply an operating potential thereto, and means connecting said semi-conductor device across said charge circuit capacitor so as to cause conduction therein whenever the capacitor voltage exceeds a predetermined value.

6. A deflection circuit for a television receiver having deflection coil means, comprising a transistor amplifier output stage having an emitter, base and collector electrode, a source of direct voltage having a first terminal connected to a point of fixed potential and a second terminal, an inductance element serially connected between said second terminal and said transistor collector electrode, means coupling said deflection coil to said collector electrode, a diode having a pair of terminals, means coupling one terminal of said diode to said transistor collector electrode, a charge circuit comprising a capacitor for supplying a sawtooth drive signal to said transistor base electrode, circuit means for providing a stable operating voltage comprising a voltage dependent resistance element and a second capacitor, means connecting said second capacitor and said resistance element in parallel between said point of fixed potential and the other terminal of said diode thereby to provide said stable operating voltage at the junction point of said diode and said voltage dependent resistance element, means connecting said stable voltage junction point to said charge circuit for supplying operating potential to said charge circuit whereby the sawtooth drive signal supplied by said charge circuit is stabilized in amplitude against voltage variations in said direct voltage source, and switching means coupled to said charge circuit for periodically discharging said capacitor.

7. Apparatus as described in claim 6 further comprising means for connecting said transistor emitter electrode to said point of fixed potential, means for connecting said deflection coil in series with a blocking capacitor, and means for connecting the series circuit formed by said deflection coil and said blocking capacitor in parallel with the emitter-collector electrode path of said transistor.

8. Apparatus as described in claim 6 further comprising a second inductance element inductively coupled to said inductance element for deriving a feedback signal, and means for coupling said feedback signal from said second inductance element to said charge circuit thereby to improve the linearity of the sawtooth drive signal waveform supplied by said charge circuit.

9. A deflection circuit for a television receiver comprising deflection coil means, a transistor amplifier output stage having an output electrode and a control electrode, a source of direct voltage having a first terminal connected to a point of fixed potential and a second terminal, a first inductance element coupled between said output electrode and said second terminal of said voltage source, means coupling said deflection coil to said output electrode, a charge circuit comprising a capacitor for supplying a sawtooth drive signal to said transistor control electrode, circuit means for providing a stable operating voltage comprising a voltage dependent resistance element and a second capacitor, means connecting said second capacitor and said resistance element in parallel for alternating currents, a second inductance element inductively coupled to said first inductance element and having a first terminal connected to said point of fixed potential, a diode having a pair of terminals, means connecting one terminal of said diode to said second inductance element, means connecting said voltage dependent resistance element between said point of fixed potential and the other terminal of said diode thereby to provide said stable operating voltage at the junction point of said diode and said voltage dependent resistance element, means connecting said stable voltage junction point to said charge circuit for supplying operating potential to said charge circuit whereby the sawtooth drive signal supplied by said charge circuit is stabilized in amplitude against voltage variations in said direct voltage source, and switching means coupled to said charge circuit for periodically discharging said capacitor.

10. A deflection circuit for a television receiver comprising deflection coil means, a transistor amplifier output stage having an emitter, base and collector electrode, a source of direct voltage having a first terminal connected to a point of fixed potential and a second terminal, an inductance element serially connected between said second terminal and said transistor collector electrode, means for connecting said transistor emitter electrode to said point of fixed potential, means for connecting said deflection coil in series with a blocking capacitor, and means for connecting the series circuit formed by said deflection coil and said blocking capacitor in parallel with the emitter-collector electrode path of said transistor, a charge circuit comprising a capacitor for supplying a sawtooth drive signal to said transistor base electrode, circuit means for providing a stable operating voltage comprising a voltage dependent resistance element and a second capacitor, a second inductance element inductively coupled to said first inductance element and having a first terminal connected to said point of fixed potential, a diode having a pair of terminals, means connecting one terminal of said diode to said second inductance element, means connecting said second capacitor and said voltage dependent resistance element in parallel between said point of fixed potential and the other terminal of said diode thereby to provide said stable operating voltage at the junction point of said diode and said voltage dependent resistance element, means connecting said stable voltage junction point to said charge circuit for supplying operating potential to said charge circuit whereby the sawtooth drive signal supplied by said charge circuit is stabilized in amplitude against voltage variations in said direct voltage source, and switching means coupled to said charge circuit for periodically discharging said capacitor.

No references cited.

DAVID G. REDINBAUGH, *Primary Examiner.*

ROBERT SEGAL, *Examiner.*